Patented Oct. 25, 1949

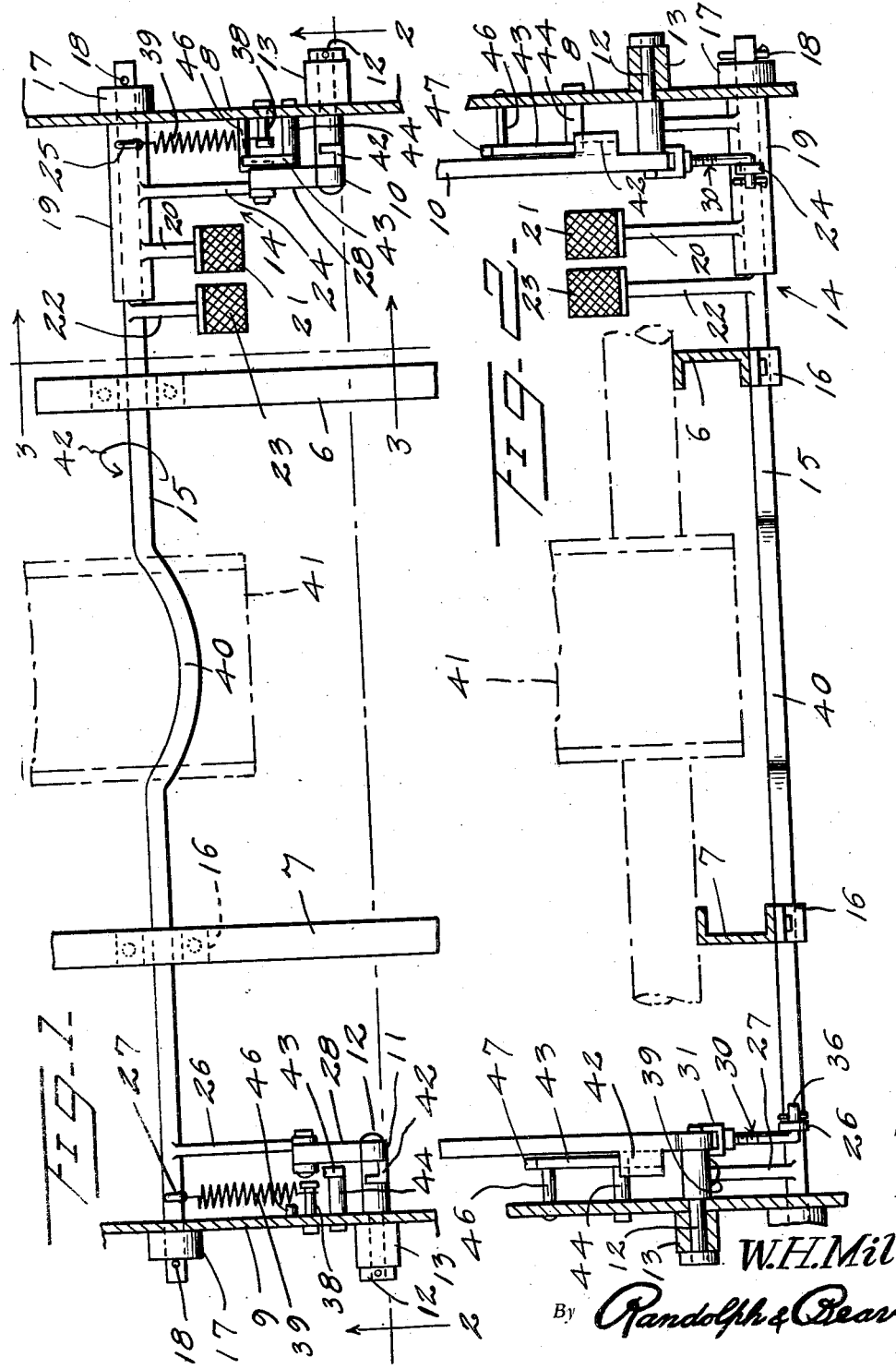

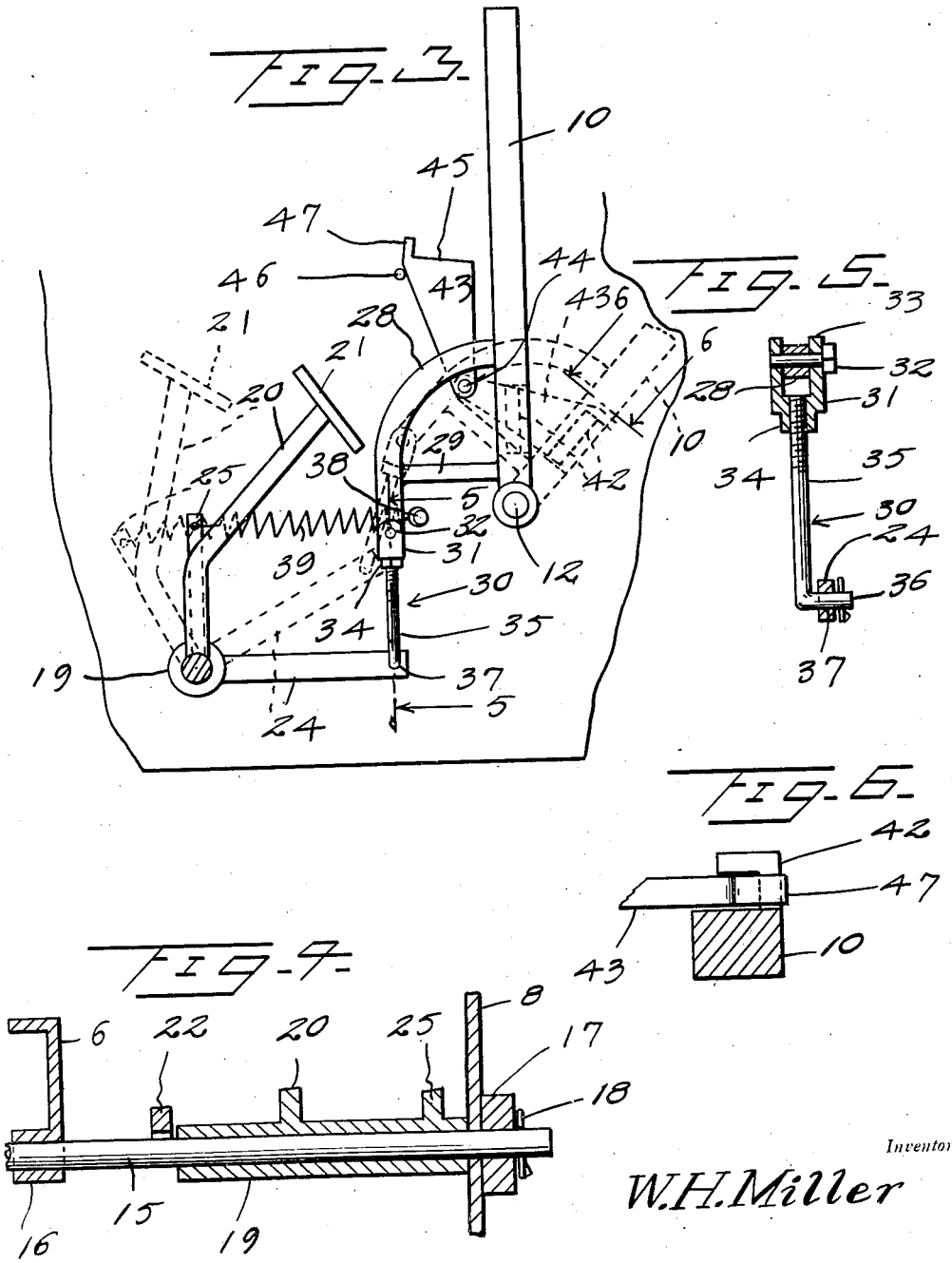

2,485,759

UNITED STATES PATENT OFFICE 2,485,759

BRAKE ACTUATOR

Walter H. Miller, Danville, Iowa

Application August 7, 1946, Serial No. 689,044

2 Claims. (Cl. 74—481)

1

This invention relates to a novel actuator for vehicle brakes and which is especially intended and adapted for use with certain type tractors the brakes of which are normally applied by means of hand operated brake levers.

The primary object of the present invention is to provide a brake actuator including auxiliary brake actuating means capable of being utilized in conjunction with the hand levers for applying the brakes to a vehicle or which may be utilized in lieu of the hand levers.

More particularly, it is the aim of the invention to provide an auxiliary foot operated brake actuator for use with hand operated brake levers wherein the right and left hand wheel or wheels of a vehicle, such as a tractor, are provided with brakes which are separately operable by right and left hand hand levers.

Other objects and advantages of the invention will hereinafter become more fully apparent from the following description of the drawings, illustrating a preferred embodiment thereof, and wherein:

Figure 1 is a fragmentary top plan view showing the invention applied to a portion of a tractor chassis;

Figure 2 is an end view in elevation thereof taken substantially along a plane as indicated by the line 2—2 of Figure 1;

Figure 3 is a transverse vertical sectional view taken substantially along a plane as indicated by the line 3—3 of Figure 1;

Figure 4 is an enlarged longitudinal sectional view taken substantially along a plane as indicated by the line 4—4 of Figure 1;

Figure 5 is a horizontal sectional view taken substantially along a plane as indicated by the line 5—5 of Figure 3, and Figure 6 is a sectional view, showing one of the hand brake levers latched in a set position, taken substantially along a plane as indicated by the line 6—6 of Figure 3.

Referring more specifically to the drawings, the numerals 6 and 7 designate longitudinal beams forming part of a chassis frame and the numerals 8 and 9 designate side members of the vehicle which are disposed outwardly of the beams 6 and 7, respectively. The members 8 and 9 provide supports for brake levers 10 and 11, respectively, which are provided with corresponding outwardly projecting stub shafts 12 which extend through and are journaled in flanged openings or bearings 13 of the side members 8 and 9. The brake levers 10 and 11 are adapted to be connected by suitable means, not shown, to the brake shoes, not shown, of the right and left wheels, respec-

2 tively, of the vehicle or tractor of which the members 6, 7, 8 and 9 form a part. The parts previously described are all of conventional construction and constitute no part of the present invention, hereinafter to be described, but have been shown and described merely to better illustrate the application and use of the auxiliary brake actuator, designated generally 14 and comprising the invention.

The auxiliary brake actuator 14 includes a transversely disposed shaft 15 which is disposed forwardly of the brake levers 10 and 11 and which is journaled beneath the beams 6 and 7 by bearing members 16 which are bolted to the undersides thereof and which are provided with downwardly offset intermediate portions, as best seen in Figure 2, to receive and journal spaced portions of the shaft 15. The ends of the shaft 15 extend through the side members 8 and 9 and are journaled in bearings 17. The ends of the shaft 15 are retained in bearings 17 by cotter pins or other means 18.

A sleeve 19 is rotatably disposed on the shaft 15 between the beam 6 and side member 8 and is provided with a foot pedal arm 20 which projects upwardly and rearwardly therefrom and which terminates in a foot pedal 21. A similar foot pedal arm 22 projects upwardly and rearwardly from the shaft 15, adjacent to the inner end of the sleeve 19 and between said sleeve and the beam 6, and is also provided on its free end with a foot pedal 23 which is located adjacent foot pedal 21, as seen in Figures 1 and 2.

As best seen in Figure 2, the sleeve 19 is provided with a rearwardly extending lever arm 24 and with an upwardly extending lever arm 25, and the shaft 15, adjacent to the side member 9, is provided with a rearwardly extending lever arm 26 and an upwardly extending lever arm 27.

The brake levers 10 and 11 are each provided with a forwardly and downwardly extending arm 28 which terminates below the axis of the stub shafts 12 and which is reinforced relatively to its lever 10 or 11 by a brace 29. The lower, free end of the arm 28 of the lever 10 is connected to the rear free end of the lever 24 by a rigid, adjustable link 30 and the lower end of the arm 28 of the lever 11 is similarly connected to the rear end of the lever 26. As best seen in Figures 3 and 5, the links 30, which are disposed substantially perpendicular, each include a clevis 31 which is pivotally connected to its lever arm 28 by a pivot pin 32 which extends loosely through an opening 33 in the lower part, as best seen in Figure 5 thereof. Each of the clevises 31 is provided with an internally threaded sleeve 34 in the intermediate portion thereof to receive the threaded end of a rod 35. The opposite end of each rod 35 is bent substantially at right angles to form a pivot pin 36 for engaging pivotally in an opening 37 in either of the levers 24 or 26. It will be readily apparent that with the end 36 disengaged from its opening 37, that the rod 35 can be turned in the sleeve 34 to extend or retract it relatively to its clevis 31 for lengthening or shortening the link 30.

An anchor pin 38 extends inwardly from each of the side members 8 and 9, between the shaft 15 and the levers 10 and 11. A contractile coiled spring 39 is attached to each of the anchor pins 38. The coil springs 39 extend forwardly from the anchor pins 38 and are attached at their opposite ends to the upper ends of the levers 25 and 27, as best illustrated in Figure 1, for urging rotation of the shaft 15 and the sleeve 19 in a clockwise direction, as seen in Figure 3, to cause the levers 10 and 11 to swing in a counter-clockwise direction or forwardly towards positions for releasing the brake shoes, not shown, to which said levers 10 and 11 are connected.

The shaft 15 is provided with an arcuate intermediate portion 40 which is normally disposed in a substantially horizontal plane, offset rearwardly with respect to the axis of the shaft 15 and which is located beneath the differential housing of the vehicle, as indicated by dotted lines 41, to be moved into engagement therewith when the shaft 15 is rotated through a predetermined arc in the direction as indicated by the arrow 42 in Figure 1 or in a counter-clockwise direction as seen in Figure 3.

The foot pedals 21 and 23 are located in a position convenient to an operator of the vehicle so as to be actuated by his right foot only, either by pressure simultaneously on both pedals 21 and 23 or selectively on either of the pedals. It is for this reason that the pedals are located in sufficiently close proximity to enable the foot to engage both pedals simultaneously, thus leaving the operator's left foot free to actuate the clutch pedal of the vehicle, not shown. When turning the vehicle, one pedal 21 or 23 only is actuated, corresponding to the direction in which the vehicle is turning, that is, in making a right turn the right pedal 21 only is applied. To stop the vehicle, both pedals 21 and 23 are actuated simultaneously. The brake pedals 21 and 23 are moved to positions for applying the brakes controlled thereby by a forward movement thereof and which turns the sleeve 19 and/or the shaft 15 in a counter-clockwise direction, as seen in Figure 3. The brake levers 10 and 11 are moved to positions for applying the brakes controlled thereby by a rearward swinging movement thereof. Consequently, this hand actuation of the brake levers may be augmented by applying a downward and forward pressure on the brake pedals to cause the sleeve 19 and/or shaft 15 to turn in a counter-clockwise direction, as seen in Figure 3, thus swinging the crank levers 24 and 26 upwardly to swing the levers 10 and 11 rearwardly to applied positions. As previously stated, the parts will be returned to their normal positions, as illustrated in the drawings, by the springs 39 when pressure is released therefrom. Likewise, the brakes, connected to the levers 10 and 11, may be applied entirely by foot pressure of the operator merely by a downward and forward pressure exerted on the brake pedals 21 and 23 thus eliminating the need for hand operation of said levers. Further, either of the right or left brakes may be applied independently by pressure on the foot pedal 21 to apply the brake connected to the hand lever 10 or by pressure on the foot pedal 23 to apply the brake connected to the hand lever 11. Whereas it is normally necessary for different operators to manually actuate the brake levers 10 and 11 to simultaneously apply the brakes on both sides of the vehicle, by the use of the foot pedals 21 and 23 one operator may apply both sets of brakes simultaneously or independently without moving from his position behind the pedals 21 and 23. The arcuate portion 40 limits the turning movement of the shaft 15 and limits the extent that the brake lever 11 can be swung for applying the brakes connected thereto.

Each of the brake levers 10 and 11 is provided with an outwardly projecting flange 42, as best seen in Figure 6, of angular cross section, and each of the side walls 8 and 9 supports a swingably mounted latch 43 which is pivotally mounted on a pin 44 which extends inwardly therefrom. As best seen in Figure 3, the latches 43 are provided with outer edge portions 45 which are adapted to engage in the flange or detent 42 of its associated lever 10 or 11 when said lever is in a rearward, applied position, as illustrated in dotted lines in Figure 3. The latch members 43 are normally supported in substantially an upright position by stop pins 46 which project inwardly from the side members 8 and 9 and are swung downwardly and rearwardly into positions to engage the detents 42, as illustrated in dotted lines in Figure 3. The latch members 43 are provided with extensions 47 which project from the upper or forward edges 45 and which engage the upper edges of the detents 42 to prevent the latches from being swung downwardly through said detents.

Various modifications and changes are contemplated and may obviously be resorted to, without departing from the spirit and scope of the invention as hereinafter defined by the appended claims.

I claim:

1. In combination with two pivotally mounted brake actuating hand levers operable for independently applying a braking action to separate wheels of a vehicle, an auxiliary brake actuating attachment including a shaft journaled transversely to the direction of swinging movement of said brake actuating levers, a sleeve journaled on said shaft, a pair of adjacently disposed foot pedals, one of said foot pedals having an arm fixed to the sleeve and the other of said foot pedals having an arm fixed to the shaft, said foot pedals being individually depressible for independently rotating the shaft and sleeve in the same direction, link and lever means connecting the sleeve to one of said brake actuating levers, and a link and lever means connecting the shaft to the other of the brake actuating levers, said link and lever means being constructed and arranged to move the brake actuating levers to brake setting positions independently when the foot pedals are depressed.

2. An auxiliary brake actuating means as in claim 1, said foot pedals being disposed in sufficiently close proximity to enable the pedals to be operated simultaneously or selectively by one foot of the operator.

WALTER H. MILLER.

(References on following page)

REFERENCES CITED

The following references are of record in the file of this patent:

UNITED STATES PATENTS

| Number | Name | Date |
|---|---|---|
| 752,582 | Packard et al. | Feb. 16, 1904 |
| 974,649 | Fishburn et al. | Nov. 1, 1910 |
| 1,324,757 | Wilson | Dec. 9, 1919 |
| 1,375,289 | Graham | Apr. 19, 1921 |
| 1,485,889 | Schmidt et al. | Mar. 4, 1924 |
| 1,576,717 | Catenaro | Mar. 16, 1926 |
| 2,145,188 | Morris | Jan. 24, 1939 |